(12) United States Patent
Nakahara et al.

(10) Patent No.: US 9,041,873 B2
(45) Date of Patent: May 26, 2015

(54) LIQUID CRYSTAL DISPLAY ELEMENT AND LIQUID CRYSTAL MODULE

(75) Inventors: Hijiri Nakahara, Osaka (JP); Yasuhiro Kohara, Osaka (JP); Mitsunori Harada, Osaka (JP); Kohji Wakashiro, Osaka (JP); Sadao Matsushita, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 82 days.

(21) Appl. No.: 13/879,222

(22) PCT Filed: Nov. 24, 2011

(86) PCT No.: PCT/JP2011/077099
§ 371 (c)(1),
(2), (4) Date: Apr. 12, 2013

(87) PCT Pub. No.: WO2012/073793
PCT Pub. Date: Jun. 7, 2012

(65) Prior Publication Data
US 2013/0215371 A1    Aug. 22, 2013

(30) Foreign Application Priority Data

Nov. 30, 2010   (JP) ................... 2010-267518

(51) Int. Cl.
*G02F 1/1335*   (2006.01)
*G02F 1/1333*   (2006.01)
*G02F 1/1343*   (2006.01)

(52) U.S. Cl.
CPC .... *G02F 1/134309* (2013.01); *G02F 2201/121* (2013.01); *G02F 2201/122* (2013.01)

(58) Field of Classification Search
CPC ................. G02F 1/133377; G02F 1/133512; G02F 1/133345; G02F 1/134363; G02F 1/133707; G02F 1/136213; G02B 27/26; G02B 27/2214; H04N 13/0404; H04N 13/0434; H04N 13/0409
USPC ................................. 49/15, 84, 141
See application file for complete search history.

(56) References Cited

U.S. PATENT DOCUMENTS

| 5,434,690 A | 7/1995 | Hisatake et al. | |
| 2008/0266387 A1* | 10/2008 | Krijn et al. | 348/51 |

(Continued)

FOREIGN PATENT DOCUMENTS

| JP | 7-234414 A | 9/1995 |
| JP | 8-076146 A | 3/1996 |
| JP | 2007-248674 A | 9/2007 |
| JP | 2010-224191 A | 10/2010 |

OTHER PUBLICATIONS

Yukiko et al., JP 2007-248674 A, Sep. 27, 2007, JPO Machine Translation.*

(Continued)

*Primary Examiner* — Mike Qi
(74) *Attorney, Agent, or Firm* — Lowe Hauptman & Ham, LLP

(57) ABSTRACT

A liquid crystal display element disclosed includes: a first substrate; a second substrate; a liquid crystal layer sandwiched between the first substrate and the second substrate; a first transparent electrode provided at a display region of the first substrate; and a second transparent electrode provided at a display region of the second substrate, at least one of d1 and d2 being not larger than 60 nm, where d1 represents a thickness of the first transparent electrode and d2 represents a thickness of the second transparent electrode.

3 Claims, 5 Drawing Sheets

(56) References Cited

U.S. PATENT DOCUMENTS

2010/0238276 A1 9/2010 Takagi et al.
2011/0128489 A1* 6/2011 Cho et al. ...................... 349/137

OTHER PUBLICATIONS

International Search Report corresponding to PCT/JP2011/077099, dated Jan. 24, 2012.

* cited by examiner

| TRANSPARENT ELECTRODE THICKNESS (nm) | 20 | 35 | 50 | 60 | 70 | 100 |
|---|---|---|---|---|---|---|
| VISUAL INSPECTION (INTERFERENCE FRINGE (RAINBOW-LIKE MOIRE)) | G | G | G | G | P | P |
| VISUAL INSPECTION (LIGHTING DEFICIENCY (ALIGNMENT DEFICIENCY)) | P | G | G | G | G | G |

LIQUID CRYSTAL DISPLAY ELEMENT AND LIQUID CRYSTAL MODULE

RELATED APPLICATIONS

The present application is a National Phase of International Application Number PCT/JP2011/077099, filed Nov. 24, 2011, and claims priority from, Japanese Application Number 2010-267518, filed Nov. 30, 2010.

TECHNICAL FIELD

The present invention relates to (i) a liquid crystal display element in which appearance of an interference fringe is inhibited and (ii) a liquid crystal module including the above liquid crystal display element and a liquid crystal display element different from the above liquid crystal display element.

In particular, the present invention relates to inhibiting appearance of an interference fringe in a liquid crystal display element including, as an electrode for a display region, only a comb-shaped transparent electrode.

BACKGROUND ART

There has been known a liquid crystal display element including two substrates attached to each other each of which is provided with a transparent electrode.

Patent Literature 1 cited below, for example, discloses a liquid crystal display element including substrates so disposed as to face each other and each provided with an electrode. This liquid crystal display element satisfies D≥S/2, where S represents the narrowest portion of a non-conductor section in an electrode structure, and D represents the distance between the respective electrodes provided on the two substrates so disposed as to face each other.

Patent Literature 1 discloses, for example, that satisfying the above relation improves the light scattering property of a liquid crystal display element.

CITATION LIST

Patent Literature 1

Japanese Patent Application Publication, Tokukaihei, No. 7-234414 A (Publication Date: Sep. 5, 1995)

SUMMARY OF INVENTION

Technical Problem

The above conventional technique, however, problematically fails to sufficiently inhibit an interference fringe (moire).

An interference fringe refers to a striped pattern that a viewer sees when viewing a display by a liquid crystal display element in a light transmitting state. Such a striped pattern appears over a display surface of a liquid crystal display element in the shape of, for example, a rainbow.

The appearance of an interference fringe decreases display quality of a liquid crystal display element.

In the case where the above liquid crystal display element is used as a parallax barrier in a liquid crystal module that performs a three-dimensional (3D) display, the above decrease in display quality is more problematic.

The present invention has been accomplished in view of the above problem. It is an object of the present invention to provide a liquid crystal display element and a liquid crystal module in each of which appearance of an interference fringe is inhibited.

Solution to Problem

In order to solve the above problem, a liquid crystal display element of the present invention includes: a first substrate; a second substrate; a liquid crystal layer sandwiched between the first substrate and the second substrate; a first transparent electrode provided at a display region of the first substrate; and a second transparent electrode provided at a display region of the second substrate, at least one of d1 and d2 being not larger than 60 nm, where d1 represents a thickness of the first transparent electrode and d2 represents a thickness of the second transparent electrode.

With the above arrangement, at least one of the transparent electrodes has a thickness of 60 nm or below. This reduces an optical-path difference occurring due to the presence or absence of a transparent electrode, which in turn makes it possible to provide a liquid crystal display element in which appearance of an interference fringe is inhibited.

Advantageous Effects of Invention

A liquid crystal display element of the present invention, as described above, includes a first transparent electrode provided at a display region of the first substrate and a second transparent electrode provided at a display region of the second substrate, at least one of d1 and d2 being not larger than 60 nm, where d1 represents a thickness of the first transparent electrode and d2 represents a thickness of the second transparent electrode.

The above arrangement makes it possible to advantageously provide a liquid crystal display element in which appearance of an interference fringe is inhibited.

BRIEF DESCRIPTION OF DRAWINGS

FIG. 1 is a diagram schematically illustrating a configuration of a liquid crystal module in accordance with an embodiment of the present invention.

FIG. 2 is a diagram schematically illustrating a configuration of a first liquid crystal display element in accordance with an embodiment of the present invention.

FIG. 3 is a diagram illustrating substrates of an embodiment of the present invention, where (a) illustrates a first substrate and (b) illustrates a second substrate.

FIG. 4 is a diagram illustrating an electrode configuration of a first liquid crystal display element in accordance with an embodiment of the present invention.

FIG. 5 is a cross-sectional view taken along line A-A in FIG. 4 in accordance with an embodiment of the present invention.

FIG. 6 is a diagram illustrating an example interference fringe.

FIG. 7 is a table showing thicknesses of transparent electrodes and the results of visual inspection.

DESCRIPTION OF EMBODIMENTS

The description below deals with an embodiment of the present invention with reference to FIGS. 1 through 7.

The present embodiment describes the present invention by taking for example a liquid crystal module including two liquid crystal display elements and capable of a three-dimensional display.

The pair of liquid crystal display elements of the present invention is not necessarily a pair as such, but may instead be substituted by a single liquid crystal display element. This point is described later.

Figure 1:
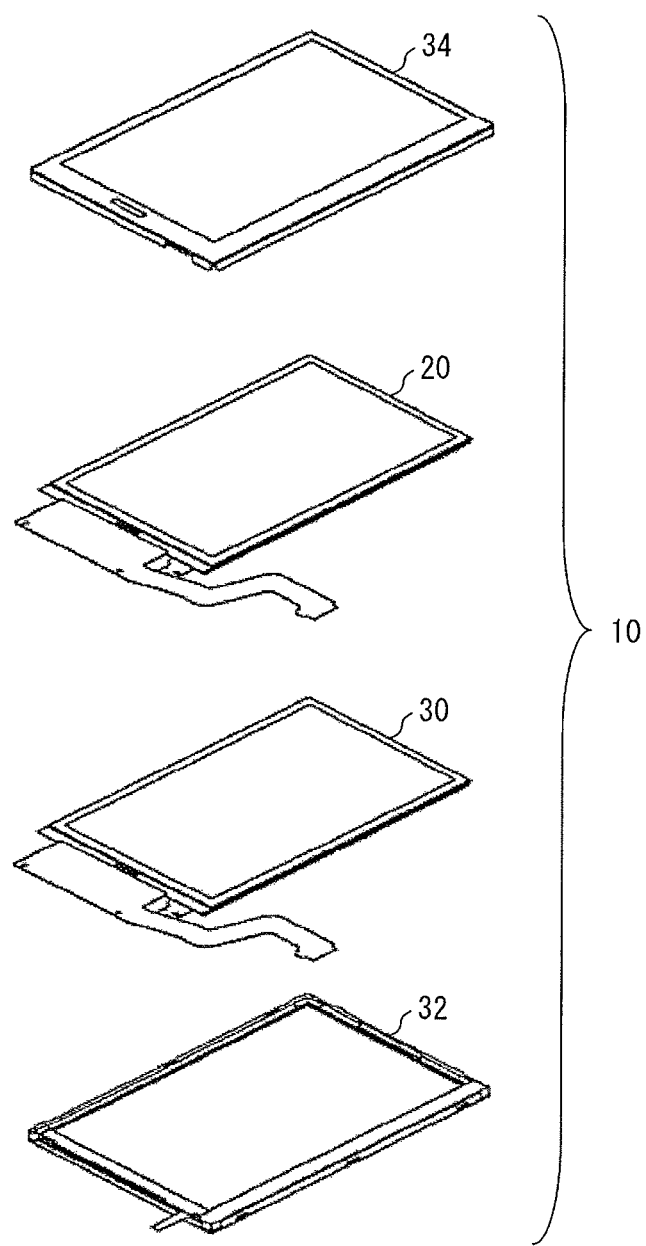
FIG. 1

FIG. 1 is a diagram schematically illustrating a liquid crystal module 10 of the present embodiment.

The liquid crystal module 10, as illustrated in FIG. 1, includes two liquid crystal display elements, namely a first liquid crystal display element 20 (liquid crystal display element) and a second liquid crystal display element 30. The liquid crystal module 10, which includes these two liquid crystal display elements, is capable of a three-dimensional display (3D display). When a viewer views, through the first liquid crystal display element 20, an image displayed by the second liquid crystal display element 30, the viewer views that image as a three-dimensional display.

(Overall Configuration)

As illustrated in FIG. 1, the liquid crystal module 10 includes, as main constituent components, a backlight 32, a second liquid crystal display element 30, a first liquid crystal display element 20, and a bezel 34. These constituent components are stacked on top of one another in the order above.

(Second Liquid Crystal Display Element)

The second liquid crystal display element 30 functions as an image display element and thus displays an image.

The second liquid crystal display element 30 is not particularly limited in configuration, and may be, for example, an active matrix liquid crystal display element including (i) pixels disposed in a matrix and (ii) TFT elements provided for the respective pixels as switches.

(First Liquid Crystal Display Element)

The first liquid crystal display element 20 functions as a parallax barrier.

The description below deals with the first liquid crystal display element 20 with reference to FIG. 2, which is a diagram schematically illustrating a configuration of the first liquid crystal display element 20.

Figure 2:
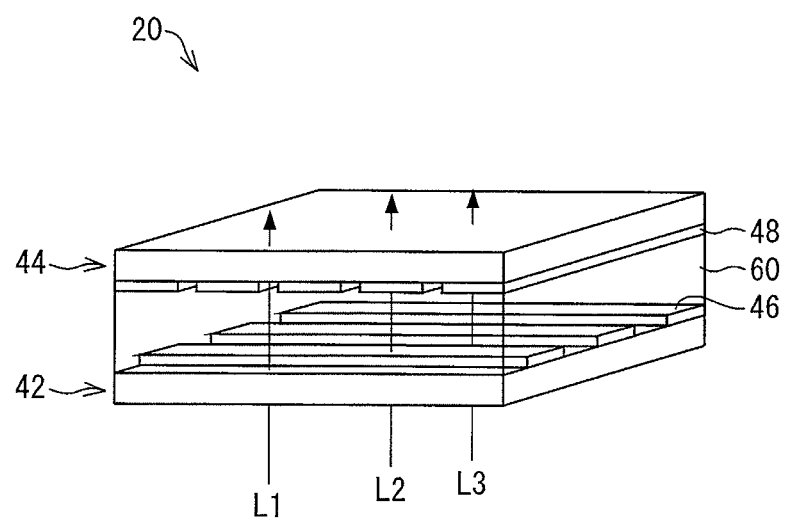
FIG. 2

The first liquid crystal display element 20 of the present embodiment, as illustrated in FIG. 2, is structured to include (i) two substrates facing each other, namely a first substrate 42 and a second substrate 44, and (ii) a liquid crystal layer 60 sandwiched between the two substrates.

The first substrate 42 and the second substrate 44 are provided with, on respective surfaces facing the liquid crystal layer 60, a first transparent electrode 46 and a second transparent electrode 48 respectively. The first transparent electrode 46 and the second transparent electrode 48 are each made of ITO, and are substantially transparent.

FIG. 2 also illustrates L1 to L3, which will be described later.

(Comb Shape)

Figure 3:
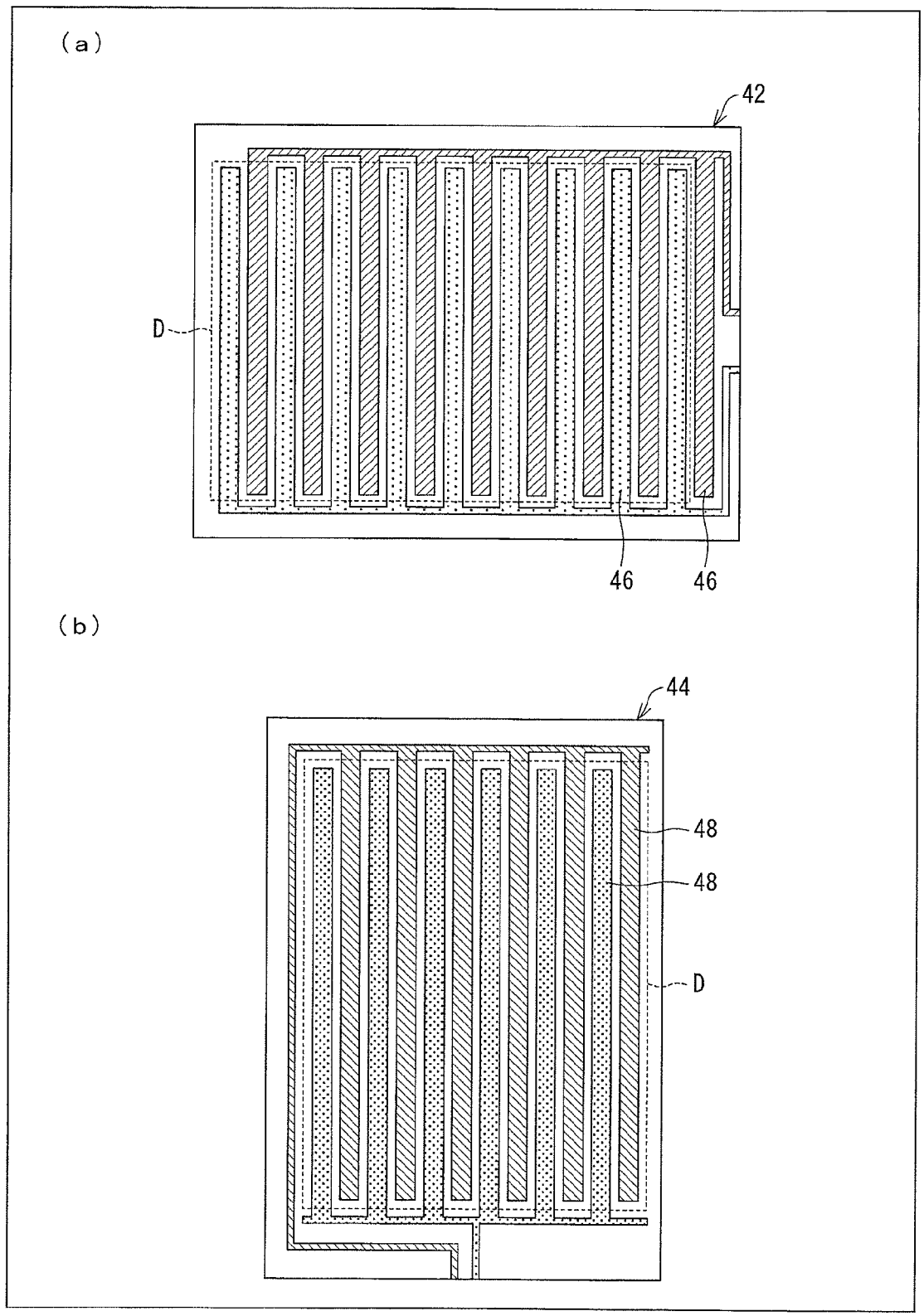
FIG. 3

The description below deals with a shape of the transparent electrodes. FIG. 3 is a diagram schematically illustrating respective configurations of the substrates of the present embodiment, where (a) illustrates the first substrate 42 and (b) illustrates the second substrate 44.

As illustrated in FIG. 3, the first transparent electrode 46 and the second transparent electrode 48 are each in a comb shape. In other words, the transparent electrodes each have a plurality of slits parallel to one another to have a plurality of portions extending in the shape of stripes.

The transparent electrodes of the present embodiment each include two comb-shaped portions facing and engaging with each other. In other words, the extending portions of the two comb-shaped portions are disposed alternately.

The substrates each have a display region (that is, the region D in FIG. 3) in which only a portion of the corresponding one of the transparent electrodes is present which portion is in the shape of comb teeth.

(Orthogonal Placement)

The transparent electrodes are, as also illustrated in FIG. 2, so provided that in the state where the two substrates are so disposed as to face each other, the comb-teeth portions (that is, the above extending portions) of one of the transparent electrodes extend in a direction that is orthogonal, in a plan view, to the direction in which the comb-teeth portions of the other of the transparent electrodes extend.

In other words, as illustrated in (a) and (b) of FIG. 3, the direction in which the comb-teeth portions extend on one of the substrates is angled at 90 degrees to the direction in which the comb-teeth portions extend on the other of the substrates. More specifically, the substrates, which are rectangular, are arranged such that the first transparent electrode 46 (pixel electrode) provided on the first substrate 42 (segment-side substrate) includes comb-teeth portions extending in a direction that is parallel to the direction along the short sides of the rectangular first substrate 42.

In contrast, the second transparent electrode 48 (counter electrode) provided on the second substrate 44 (common-side substrate) includes comb-teeth portions extending in a direction that is parallel to the direction along the long sides of the rectangular second substrate 44.

(How Substrates are Attached)

The first liquid crystal display element 20 of the present embodiment is arranged such that the first substrate 42 and the second substrate 44 are, as described above, attached to each other in such a manner that the comb-teeth portions of the first transparent electrode 46 extend in a direction that is orthogonal, in a plan view, to the direction in which the comb-teeth portions of the second transparent electrode 48 extend.

Figure 4:
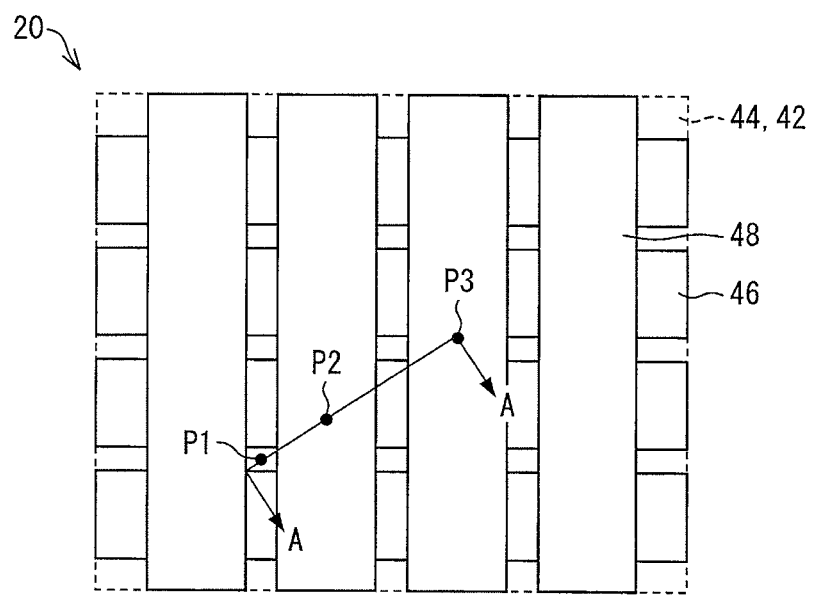
FIG. 4

FIG. 4 is a diagram illustrating an electrode configuration of the first liquid crystal display element 20 in correspondence with an embodiment of the present invention. Specifically, FIG. 4 schematically illustrates respective configurations of the first transparent electrode 46 and second transparent electrode 48 in a plan view of the first liquid crystal display element 20 from the side of the second substrate 44.

The first liquid crystal display element 20 includes comb-teeth electrodes extending orthogonally to each other. Thus, as illustrated in FIG. 4, the first liquid crystal display element 20 has, in a plan view, (i) a portion with no electrode, (ii) a portion with two electrode layers overlapping each other, and (iii) a portion with only one electrode layer.

Specifically, the first liquid crystal display element 20 has no transparent electrode at the first position P1 (see FIG. 4) in a plan view since neither the first transparent electrode 46 nor the second transparent electrode 48 is present at the first position P1.

The first liquid crystal display element 20 has two transparent electrode layers at the second position P2 in a plan view since both the first transparent electrode 46 and the second transparent electrode 48 are present at the second position P2.

The first liquid crystal display element 20 has only one transparent electrode layer at the third position P3 in a plan view since the second transparent electrode 48 is present at the third position P3, whereas the first transparent electrode 46 is absent at the third position P3.

(Cross Section)

Figure 5:
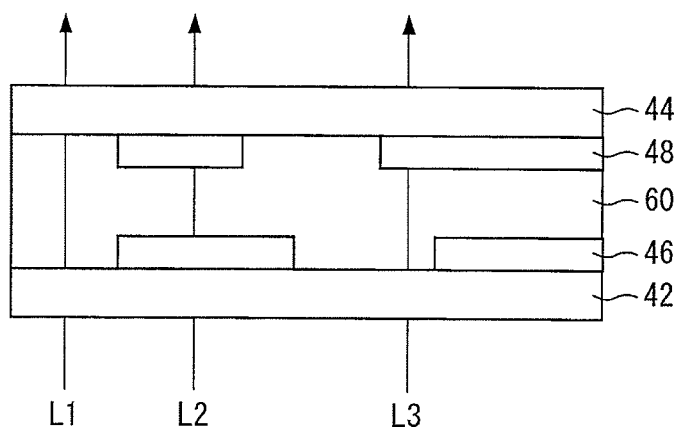
FIG. 5

FIG. 5 is a cross-sectional view taken along line A-A in FIG. 4, and illustrates a cross-sectional configuration of the first liquid crystal display element 20.

FIG. 5 illustrates transmitted light beams L1 to L3, which are transmitted light beams at the respective positions P1 to P3 in FIG. 4. The transmitted light beams L1 to L3 in FIG. 5 correspond to those in FIG. 2.

The transmitted light beams L1 to L3 at the respective positions P1 to P3 have, as illustrated in FIG. 5, respective optical paths within the liquid crystal layer 60 that differ from one another in length (optical-path difference). In other words, the transmitted light beams L1 to L3 have respective optical path lengths different from one another, the optical path of the transmitted light beam L1 being longer than that of the transmitted light beam L2, the optical path of the transmitted light beam L2 being longer than that of the transmitted light beam L3.

(Interference Fringe)

An optical-path difference present between adjacent portions of a liquid crystal display element as described above may cause an interference fringe to be observed by a viewer viewing a display by the liquid crystal display element in a plan view.

Figures 6, 7:
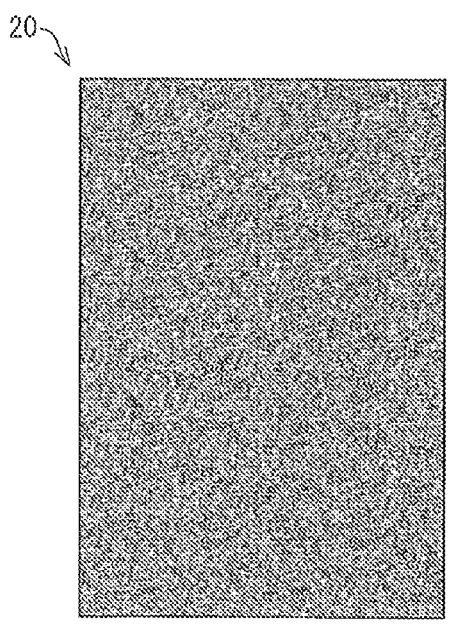
FIG. 6
FIG. 7

FIG. 6 illustrates an example interference fringe. FIG. 6 illustrates rainbow-like moire in the shape of a rainbow as an example interference fringe observed by a viewer viewing a display by the first liquid crystal display element 20 in a plan view.

An interference fringe tends to be observed particularly when the first liquid crystal display element 20 is in a light transmitting state. For instance, in the case where the first liquid crystal display element 20 is of a normally white type, an interference fringe tends to be observed when no voltage is being applied.

(Thicknesses of Transparent Electrodes)

The first liquid crystal display element 20 of the present embodiment, in view of the above appearance of an interference fringe, includes transparent electrodes each having an optimized thickness. This inhibits appearance of an interference fringe.

The description below refers to FIG. 7, which shows thicknesses of the transparent electrodes and the results of visually inspecting a display by a liquid crystal display element.

Specifically, FIG. 7 shows the results of visually observing (inspecting) a display by the first liquid crystal display element while varying the respective thicknesses of the first transparent electrode 46 and second transparent electrode 48 in the first liquid crystal display element 20. The results shown in FIG. 7 are of an example in which the first transparent electrode 46 and the second transparent electrode 48 have an equal thickness.

The visual inspection has two items: whether an interference fringe (rainbow-like moire) is observed in the light transmitting state (that is, in the case where the first liquid crystal display element 20 is of a normally white type, a state in which no voltage is being applied) and whether a lighting deficiency (alignment deficiency) is observed in a displaying state (that is, in the case where the first liquid crystal display element 20 is of a normally white type, a state in which a voltage is being applied).

(Interference Fringe and Transparent Electrode Thicknesses)

The example results shown in FIG. 7 are of performing visual inspection while varying the respective thicknesses of the first transparent electrode 46 and second transparent electrode 48 within a range from 20 nm to 100 nm.

As illustrated in FIG. 7, an interference fringe appears ("P") with the respective thicknesses of the transparent electrodes of 70 nm or 100 nm, whereas no interference fringe appears ("G") with the respective thicknesses of the transparent electrodes of 60 nm or below. This indicates that reducing the respective thicknesses of the transparent electrodes tends to inhibit appearance of an interference fringe and that no interference fringe presumably appears at least with the respective thicknesses of the transparent electrodes of 60 nm or below.

This is presumed to be partly because reducing the respective thicknesses of the transparent electrodes reduces the optical-path difference described above.

(Lighting Deficiency and Transparent Electrode Thicknesses)

A lighting deficiency arising from an alignment deficiency, in contrast, tends to occur ("P") with smaller thicknesses of the transparent electrodes. Specifically, no lighting deficiency occurs ("G") with the respective thicknesses of the transparent electrodes of 35 nm or above, whereas an alignment deficiency occurs with the respective thicknesses of the transparent electrodes of 20 nm.

An alignment deficiency occurs presumably because a desired voltage is not applied to the liquid crystal molecule, which is likely to arise in case of an excessively large sheet resistance of a transparent electrode.

The respective thicknesses of the transparent electrodes of 35 nm or above allow the sheet resistance to be 100Ω or less. This presumably makes occurrence of an alignment deficiency unlikely, and thus makes occurrence of a lighting deficiency unlikely.

(Display Quality)

The first liquid crystal display element 20 of the present embodiment is arranged such that the first transparent electrode 46 and the second transparent electrode 48 each have a thickness ranging from 25 nm to 60 nm and that the transparent electrodes each have a sheet resistance of 100Ω or below.

The above arrangement inhibits appearance of an interference fringe and occurrence of a lighting deficiency in the first liquid crystal display element 20.

(Liquid Crystal Module)

The liquid crystal module 10 of the present embodiment includes the first liquid crystal display element 20, in which appearance of an interference fringe and occurrence of a lighting deficiency are inhibited. The liquid crystal module 10 is thus capable of a high-quality display.

The liquid crystal module 10, which includes two liquid crystal display elements (namely, the first liquid crystal display element 20 and the second liquid crystal display element 30), is capable of a three-dimensional display as mentioned above.

(Two-Dimensional Display)

The description below first deals with a two-dimensional display. The liquid crystal module 10, when performing a two-dimensional display, causes an image displayed by the second liquid crystal display element 30, which functions as an image display element, to be displayed directly toward a viewer. The first liquid crystal display element 20, which functions as a parallax barrier, is thus in a light transmitting state.

The first liquid crystal display element 20 of the present embodiment is, in the light transmitting state, unlikely to cause an interference fringe to appear.

The liquid crystal module 10 is consequently capable of a high-quality two-dimensional display.

(Three-Dimensional Display)

The description below now deals with a three-dimensional display. The liquid crystal module 10, when performing a three-dimensional display, does not cause an image displayed by the second liquid crystal display element 30, which functions as an image display element, to be displayed directly toward a viewer, but instead causes such an image to be displayed through a parallax barrier.

Specifically, the liquid crystal module 10 causes the first liquid crystal display element 20, which functions as a parallax barrier, to display a desired design such as a striped pattern.

The above arrangement allows a viewer to view the above image, displayed by the second liquid crystal display element 30, through the design displayed by the first liquid crystal display element 20.

The above arrangement thus allows the viewer to view a three-dimensional display without use of eyeglasses for a three-dimensional display.

The first liquid crystal display element 20 of the present embodiment is, in the displaying state, unlikely to cause a display deficiency to occur. Specifically, the first liquid crystal display element 20 is unlikely to, for instance, cause (i) discontinuity in the design such as a stripe pattern or (ii) decrease in contrast.

The liquid crystal module 10 is consequently capable of a high-quality three-dimensional display.

(Multiview Display)

The description below now deals with a multiview display. The liquid crystal module 10 of the present embodiment may further include a combining gap adjusting member between the first liquid crystal display element 20 and the second liquid crystal display element 30. This arrangement makes it possible to adjust the gap that is present between the first liquid crystal display element 20 and the second liquid crystal display element 30 in the state where they are combined with each other.

As in the case of performing a three-dimensional display, the liquid crystal module 10, when performing a multiview display, does not cause an image displayed by the second liquid crystal display element 30, which functions as a pixel display element, to be displayed directly toward a viewer, but instead causes such an image to be displayed through a parallax barrier.

Specifically, the liquid crystal module 10 causes the first liquid crystal display element 20, which functions as a parallax barrier, to display a desired design such as a striped pattern, and further causes the combining gap adjusting member to adjust the gap between the first liquid crystal display element 20 and the second liquid crystal display element 30.

The above arrangement allows a viewer to view the above image, displayed by the second liquid crystal display element 30, through the design displayed by the first liquid crystal display element 20.

The above arrangement thus allows the viewer to view images different from one another depending on the position of the viewer. In other words, the above arrangement allows the viewer to view a multiview display.

The first liquid crystal display element 20 of the present embodiment is, in the displaying state, unlikely to cause a display deficiency to occur. Specifically, the first liquid crystal display element 20 is unlikely to, for instance, cause (i) discontinuity in the design such as a stripe pattern or (ii) decrease in contrast.

The liquid crystal module 10 is consequently capable of a high-quality multiview display.

As described above, the first liquid crystal display element 20 of the present embodiment includes transparent electrodes each having an optimized thickness. The first liquid crystal display element 20 is consequently a liquid crystal display element in which appearance of an interference fringe, for example, is inhibited and which has high display quality.

The present invention is not limited to the description of the embodiment above, but may be altered in various ways by a skilled person within the scope of the claims. Any embodiment based on a combination of technical means altered within the scope of the claims is also encompassed in the technical scope of the present invention.

For example, the liquid crystal layer 60 of the present embodiment is not particularly limited in thickness. The liquid crystal layer 60 has a thickness of, for example, 4.5 μm to 7.0 μm, or preferably 4.6 μm to 6.4 μm.

The material of the transparent electrodes is not limited to ITO, and may be another transparent conductive material. Such another transparent conductive material preferably has a refractive index ranging from 1.8 to 2.0.

The transparent electrodes are described above as each including comb-shaped portions facing and engaging with each other. The transparent electrodes are thus described above as being of a both-side power feeding type. The transparent electrodes are, however, not limited to the above in arrangement, and may, for example, each include only one comb-shaped portion.

The first transparent electrode and the second transparent electrode are described above as each being in a comb shape. The first transparent electrode and the second transparent electrode are, however, not limited to the above in arrangement. One of the first transparent electrode and the second transparent electrode may, for example, be an allover electrode.

In particular, in the case where the second transparent electrode 48 is an allover electrode, scattering of light can be inhibited at edges of the electrodes. This arrangement can inhibit appearance of an interference fringe.

The description above has dealt with the arrangement of combining the first liquid crystal display element 20 with the second liquid crystal display element 30 to perform a three-dimensional display. However, as mentioned earlier, the first liquid crystal display element 20 may be used by itself. The first liquid crystal display element 20 may be used as, for example, a simple matrix STN display element. This arrangement also can provide a liquid crystal display element in which appearance of an interference fringe and occurrence of a lighting deficiency are inhibited.

The liquid crystal display element of the present invention may be arranged such that at least one of the first transparent electrode and the second transparent electrode is in a comb shape.

The liquid crystal display element of the present invention may be arranged such that the first transparent electrode and the second transparent electrode are each in a comb shape; the first transparent electrode has a comb-teeth portion extending in a first direction; the second transparent electrode has a comb-teeth portion extending in a second direction; and the first direction is orthogonal to the second direction in a plan view.

With the above arrangements, either or both of the transparent electrodes are in a comb shape. This causes optical-path differences to occur at a large number of portions, which is in turn likely to cause an interference fringe to appear. An interference fringe is more likely to appear in the case where comb-shaped transparent electrodes facing each other are orthogonal to each other.

In view of the above problem, the liquid crystal display element having either of the above arrangements includes thin transparent electrodes, and can thus inhibit appearance of an interference fringe.

The liquid crystal display element of the present invention may be arranged such that a portion of the first transparent electrode which portion is present in the display region of the first substrate is only a comb-teeth portion; and a portion of the second transparent electrode which portion is present in the display region of the second substrate is only a comb-teeth portion.

According to the above arrangement, only a comb-teeth portion of each transparent electrode is present in the display region. This causes an interference fringe to be easily noticed by a viewer.

In view of the above problem, the liquid crystal display element having the above arrangement includes thin transparent electrodes, and can thus inhibit an interference fringe from being easily noticed by a viewer.

The liquid crystal display element of the present invention may preferably be arranged such that the first transparent electrode and the second transparent electrode each have a sheet resistance of not larger than 100Ω.

The liquid crystal display element of the present invention may preferably be arranged such that the d1 and the d2 are each not smaller than 25 nm.

With either of the above arrangements, the transparent electrodes each have a sheet resistance of not larger than 100Ω or a thickness of not smaller than 25 nm. This facilitates application of a desired voltage to the liquid crystal layer.

The above arrangement can thus inhibit display quality from decreasing due to an alignment deficiency.

The liquid crystal display element of the present invention may be arranged such that the liquid crystal display element is used for a three-dimensional display.

A liquid crystal module of the present invention includes: the above-described liquid crystal display element; and a second liquid crystal display element so provided as to overlap the liquid crystal display element in a plan view, the liquid crystal module performing a three-dimensional display by causing the liquid crystal display element to display a desired design.

The above arrangements allow the liquid crystal display element, in which appearance of an interference fringe is inhibited, to be used as, for example, a parallax barrier for a three-dimensional display.

The above arrangements thus facilitate, for example, performing a three-dimensional display without use of eyeglasses for a three-dimensional display.

INDUSTRIAL APPLICABILITY

The liquid crystal display element of the present invention, in which appearance of an interference fringe is inhibited, is suitably usable as a liquid crystal display element including comb-shaped transparent electrodes.

REFERENCE SIGNS LIST

10 liquid crystal module
20 first liquid crystal display element
30 second liquid crystal display element
32 backlight
34 bezel
42 first substrate (segment-side substrate)
44 second substrate (common-side substrate)
46 first transparent electrode (pixel electrode)
48 second transparent electrode (counter electrode)
60 liquid crystal layer
D display region
P1 to P3 position
L1 to L3 transmitted light beam

The invention claimed is:

1. A liquid crystal display element, comprising:
   a first substrate;
   a second substrate;
   a liquid crystal layer sandwiched between the first substrate and the second substrate;
   a first transparent electrode provided at a display region of the first substrate; and
   a second transparent electrode provided at a display region of the second substrate,
   each of d1 and d2 being not larger than 60 nm, and each of d1 and d2 being equal to or larger than 35 nm, where d1 represents a thickness of the first transparent electrode and d2 represents a thickness of the second transparent electrode.

2. The liquid crystal display element according to claim 1, wherein the liquid crystal display element is configured for a three-dimensional display.

3. A liquid crystal module, comprising:
   a first liquid crystal display element; and
   a second liquid crystal display element overlapping said first liquid crystal display element in a plan view,
   wherein the liquid crystal module is configured to perform a three-dimensional display by causing said first liquid crystal display element to display a desired design, and
   wherein the first liquid crystal display element comprises:
      a first substrate;
      a second substrate;
      a liquid crystal layer sandwiched between the first substrate and the second substrate;
      a first transparent electrode provided at a display region of the first substrate; and
      a second transparent electrode provided at a display region of the second substrate,
      each of d1 and d2 being not larger than 60 nm, and each of d1 and d2 being equal to or larger than 35 nm, where d1 represents a thickness of the first transparent electrode and d2 represents a thickness of the second transparent electrode.

* * * * *